United States Patent
Kim et al.

(10) Patent No.: US 12,286,071 B2
(45) Date of Patent: Apr. 29, 2025

(54) AUTOMOTIVE CRASH PAD AND MANUFACTURING METHOD THEREOF

(71) Applicant: HYUNDAI MOBIS Co., LTD., Seoul (KR)

(72) Inventors: Do Hyung Kim, Yongin-si (KR); Chang Wan Son, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 197 days.

(21) Appl. No.: 17/950,047

(22) Filed: Sep. 21, 2022

(65) Prior Publication Data
US 2023/0031664 A1    Feb. 2, 2023

Related U.S. Application Data

(62) Division of application No. 17/093,459, filed on Nov. 9, 2020.

(30) Foreign Application Priority Data

Jul. 21, 2020  (KR) .................. 10-2020-0090302

(51) Int. Cl.
*B60R 21/045*    (2006.01)
*B32B 5/02*    (2006.01)
(Continued)

(52) U.S. Cl.
CPC ........... *B60R 21/045* (2013.01); *B32B 5/022* (2013.01); *B32B 5/026* (2013.01); *B32B 5/20* (2013.01);
(Continued)

(58) Field of Classification Search
None
See application file for complete search history.

(56) References Cited

U.S. PATENT DOCUMENTS

| | | |
|---|---|---|
| 9,744,931 B2 | 8/2017 | Son et al. |
| 11,242,429 B2 | 2/2022 | Son et al. |

(Continued)

FOREIGN PATENT DOCUMENTS

| | | |
|---|---|---|
| CN | 111423559 | 7/2020 |
| DE | 102014111914 | 2/2015 |

(Continued)

OTHER PUBLICATIONS

Machine English translation of JP2012031237, Accessed May 24, 2024 (Year: 2012).*

(Continued)

*Primary Examiner* — Jacob T Minskey
*Assistant Examiner* — Adrianna N Konves
(74) *Attorney, Agent, or Firm* — NSIP Law

(57) ABSTRACT

An automotive crash pad and a method for manufacturing the same. The automotive crash pad includes: a skin layer forming the outer surface of the crash pad including an airbag module; a fiber-based layer formed on the lower surface of the skin layer; a cushion layer formed on the lower surface of the fiber-based layer and including slab foam; and a core layer formed on the lower surface of the cushion layer, wherein a laminate of the skin layer and the fiber-based layer has a tensile strength in a transverse direction (TD) of 5 to 50 kgf/3 cm and an elongation at break in the transverse direction (TD) of 40 to 220%.

4 Claims, 4 Drawing Sheets

(51) Int. Cl.
- *B32B 5/20* (2006.01)
- *B32B 5/24* (2006.01)
- *B32B 7/12* (2006.01)
- *B32B 27/06* (2006.01)
- *B32B 27/12* (2006.01)
- *B32B 27/40* (2006.01)
- *B32B 37/14* (2006.01)
- *B60R 21/205* (2011.01)
- *B60R 21/215* (2011.01)
- *B32B 37/12* (2006.01)
- *B32B 37/26* (2006.01)
- *B32B 38/00* (2006.01)

(52) U.S. Cl.
CPC ............... *B32B 5/245* (2013.01); *B32B 7/12* (2013.01); *B32B 27/065* (2013.01); *B32B 27/12* (2013.01); *B32B 27/40* (2013.01); *B32B 37/142* (2013.01); *B60R 21/205* (2013.01); *B60R 21/215* (2013.01); *B32B 37/12* (2013.01); *B32B 2037/266* (2013.01); *B32B 2038/0084* (2013.01); *B32B 2266/0278* (2013.01); *B32B 2305/022* (2013.01); *B32B 2305/10* (2013.01); *B32B 2307/54* (2013.01); *B32B 2307/5825* (2013.01); *B32B 2307/72* (2013.01); *B32B 2307/732* (2013.01); *B32B 2605/003* (2013.01)

(56) References Cited

U.S. PATENT DOCUMENTS

| | | |
|---|---|---|
| 2007/0117489 A1 | 5/2007 | Yamamoto et al. |
| 2012/0025566 A1* | 2/2012 | Wisniewski ............ B32B 9/025 428/314.4 |
| 2012/0055201 A1* | 3/2012 | Keitch .................. D04B 21/16 112/475.01 |
| 2015/0054270 A1 | 2/2015 | Kang |
| 2015/0174853 A1 | 6/2015 | Jeon |
| 2020/0216602 A1 | 7/2020 | Son et al. |
| 2021/0046732 A1 | 2/2021 | de Pinho et al. |

FOREIGN PATENT DOCUMENTS

| | | |
|---|---|---|
| DE | 102015203964 | 9/2015 |
| EP | 3533600 | 9/2019 |
| JP | 2012031237 | 2/2012 |
| KR | 10-2009-0104535 | 10/2009 |
| KR | 10-2011-0123615 | 11/2011 |
| KR | 10-2015-0024464 | 3/2015 |
| KR | 10-2015-0135708 | 12/2015 |
| KR | 10-2016-0003990 | 1/2016 |
| KR | 10-2020-0086399 | 7/2020 |

OTHER PUBLICATIONS

Non-Final Office Action dated Jul. 13, 2023, issued to U.S. Appl. No. 17/093,459.

Non-Final Office Action dated Oct. 18, 2022, issued to U.S. Appl. No. 17/093,459.

Final Office Action dated Feb. 28, 2023, issued to U.S. Appl. No. 17/093,459.

* cited by examiner

AUTOMOTIVE CRASH PAD AND MANUFACTURING METHOD THEREOF

CROSS-REFERENCE TO RELATED APPLICATIONS

This application is a division of U.S. patent application Ser. No. 17/093,459, filed on Nov. 9, 2020, which claims priority from and the benefit of Korean Patent Application No. 10-2020-0090302, filed on Jul. 21, 2020, which is hereby incorporated by reference for all purposes as if set forth herein.

BACKGROUND

Field

Exemplary embodiments of the present disclosure relate to an automotive crash pad and a manufacturing method thereof.

Discussion of the Background

A crash pad, also called an instrument panel, is an automotive interior part that is attached to the lower end of the front glass of the driver's seat. An airbag is mounted in the crash pad. The airbag functions to protect the occupant's life from an external shock by deployment through the seam line of the crash pad when a crash occurs. Thus, the airbag is a very important part in terms of design, convenience and stability.

FIG. 1 illustrates a conventional automotive crash pad, and FIG. 2 illustrates a conventional crash pad. Referring to FIGS. 1 and 2, a crash pad 100 includes a core layer 1, a cushion layer 2 formed on the surface of the core layer 1, and a skin layer 3 formed on the surface of the cushion layer 2. The core layer, the cushion layer and the skin layer are adhered together using an aqueous adhesive.

Meanwhile, in recent years, as there has been a demand for luxury cars, the automotive crash pad has also been required to have excellent sensitivity, tactile sensation and appearance. This high-quality crash pad may include a skin layer manufactured using natural leather. However, natural leather has problems in that it is expensive and the quality control thereof is difficult, so that deformation or surface damage of the natural leather easily occurs. Therefore, there is an urgent need for the development of artificial leather, which exhibits sensitivity, tactile sensation and appearance similar to those of natural leather and also has excellent mechanical properties, and a crash pad using the same.

Here, the skin layer 3 is formed using the material and coating agent that may have the appearance and feel of real leather to emphasize design and aesthetic quality. Referring to FIG. 2, a skin layer-weakening portion 4 for deployment of the airbag (passenger airbag (PAB)) is formed on the skin layer 3 by performing a skin layer-weakening process on the skin layer 3. Specifically, the airbag deployment portion of the skin layer, which corresponds to the airbag deployment portion of the crash pad, is processed by skiving or skin scoring to reduce the thickness of the skin layer.

However, when the crash pad is manufactured by performing the skin layer-weakening process, problems arise in that material and process costs increase, resulting in decreases in productivity and economic efficiency, and the labor cost and work time associated with the skin layer-weakening process are added.

Background art related to the present disclosure includes Korean Patent Application Publication No. 2015-0135708 (published on Dec. 3, 2015; entitled "Method for Manufacturing Crash Pad Skin").

The above information disclosed in this Background section is only for enhancement of understanding of the background of the invention and, therefore, it may contain information that does not constitute prior art.

SUMMARY

Exemplary embodiments of the present invention provide an automotive crash pad which has excellent airbag deployment performance, and thus, makes it possible to eliminate a skin layer-weakening process when forming a skin layer.

Another object of the present disclosure is to provide an automotive crash pad having excellent economic efficiency due to process simplification and cost reduction.

Still another object of the present disclosure is to provide an automotive crash pad having excellent sensitivity properties, such as appearance and tactile sensation.

Yet another object of the present disclosure is to provide an automotive crash pad having excellent lightweight and mechanical properties.

Still yet another object of the present disclosure is to provide an automotive crash pad having excellent adhesion between a skin layer and a slab foam layer.

A further object of the present disclosure is to provide a method for manufacturing the automotive crash pad.

Additional features of the invention will be set forth in the description which follows, and in part will be apparent from the description, or may be learned by practice of the invention.

An exemplary embodiment of the present invention provides an automotive crash pad including: a skin layer forming the outer surface of the crash pad including an airbag module; a fiber-based layer formed on the lower surface of the skin layer; a cushion layer formed on the lower surface of the fiber-based layer and including slab foam; and a core layer formed on the lower surface of the cushion layer, wherein a laminate of the skin layer and the fiber-based layer has a tensile strength in transverse direction (TD) of 5 to 50 kgf/3 cm and an elongation at break in transverse direction (TD) of 40 to 220%.

The skin layer may have a thickness of 0.1 to 0.7 mm, the fiber-based layer may have a thickness of 0.3 to 0.7 mm, the cushion layer may have a thickness of 1 to 10 mm, and the core layer may have a thickness of 1 to 6 mm.

The cushion layer may have a density of 0.05 to 5 g/cm3, a porosity of 5 to 80%, a tensile strength of 3 to 20 kgf/cm2, an elongation of 50 to 200%, and a tearing strength of 0.2 to 1.5 kgf/cm.

The skin layer may include one or more of thermoplastic polyurethane, thermoplastic polyolefin, polyvinyl chloride, and thermosetting polyurethane.

The skin layer may be formed using a skin layer composition including 65 to 75 wt % of a polyol compound, 15 to 25 wt % of an isocyanate-based curing agent, and 10 to 15 wt % of a chain extender.

The slab foam may be formed by foaming a first composition including 40 to 75 wt % of a polyol compound, 15 to 45 wt % of an isocyanate-based curing agent, and 1 to 15 wt % of a foaming agent.

The crash pad may further include one or more of a first adhesive layer formed between the fiber-based layer and the cushion layer, and a second adhesive layer formed between the cushion layer and the core layer.

The crash pad may further include a surface treatment layer formed on at least a portion of the skin layer.

The fiber-based layer may have a density of 0.22 to 0.27 g/cm3 and may be in the form of knitted or nonwoven fabric.

Another exemplary embodiment of the present invention provides a method for manufacturing an automotive crash pad, the automotive crash pad including: a skin layer forming the outer surface of the crash pad including an airbag module; a fiber-based layer formed on the lower surface of the skin layer; a cushion layer formed on the lower surface of the fiber-based layer and including slab foam; and a core layer formed on the lower surface of the cushion layer, the method including steps of: preparing an intermediate by laminating the cushion layer and the core layer together; and laminating the fiber-based layer and the skin layer onto the intermediate, wherein a laminate of the skin layer and the fiber-based layer has a tensile strength in transverse direction (TD) of 5 to 50 kgf/3 cm and an elongation at break in transverse direction (TD) of 40 to 220%.

The laminating in the step of laminating the fiber-based layer and the skin layer onto the intermediate may be achieved by forming a first adhesive layer between the fiber-based layer and the cushion layer.

The laminating in the step of preparing the intermediate may be achieved by forming a second adhesive layer between the cushion layer and the core layer.

The method may further include a step of covering the fiber-based layer, the cushion layer and the core layer with the skin layer, after the step of laminating the fiber-based layer and the skin layer onto the intermediate.

The slab foam may be formed by foaming a first composition including a polyol compound, an isocyanate-based curing agent, and a foaming agent.

The skin layer may not be subjected to a skiving or scoring process.

The automotive crash pad according to the present disclosure allows the airbag to be quickly deployed in the event of an external shock, even when a skin layer-weakening process, such as skiving or scoring, is eliminated. In addition, the automotive crash pad may have a good tear shape, and have excellent productivity and economic efficiency due to process simplification and cost reduction. Furthermore, the automotive crash pad may have excellent adhesion between the skin layer and the slab foam layer, and may have excellent sensitivity properties, such as appearance and soft tactile sensation, as a result of reducing the thickness of the skin layer and applying the slab foam layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE EMBODIMENTS

Figure 1:
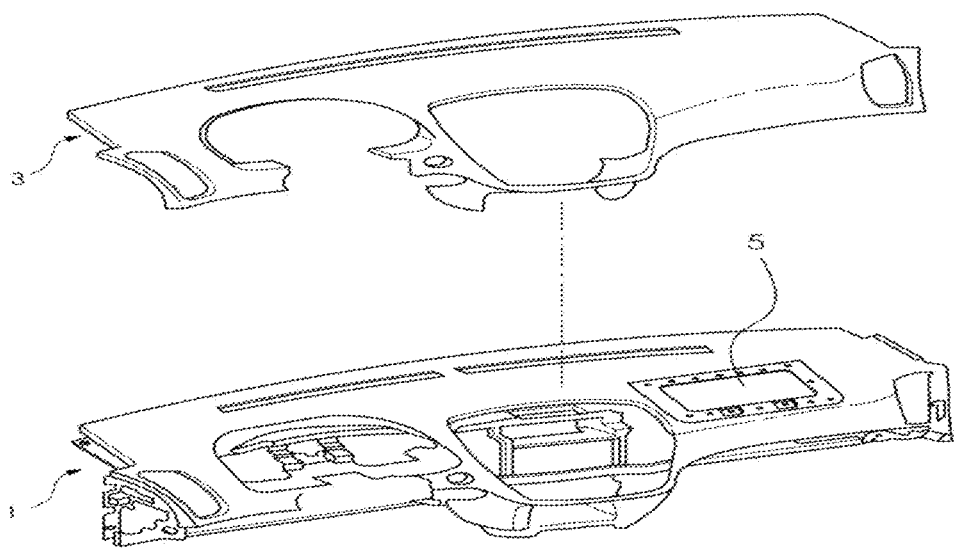
FIG. 1 illustrates a conventional automotive crash pad.
Figure 2:
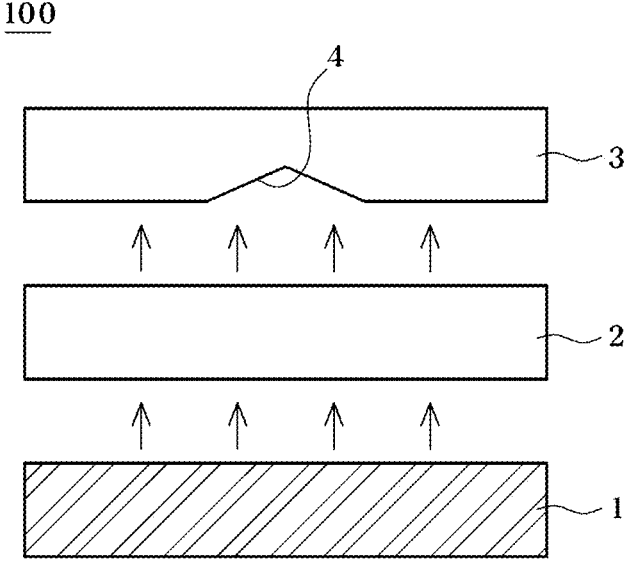
FIG. 2 illustrates the conventional crash pad.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

In the following description, the detailed description of related publicly-known technology or configuration will be omitted when it may unnecessarily obscure the subject matter of the present disclosure.

In addition, the terms used in the following description are terms defined considering the functions in the present disclosure, and may be changed in accordance with the option of a user or operator or a usual practice. Accordingly, the definition of the terms should be made based on the contents throughout the present specification.

In the present specification, the terms "upper portion" and "lower portion" are defined based on the drawings, and depending on the point of view, "upper portion" may be changed to "lower portion" and "lower portion" may be changed to "upper portion". In addition, in the present disclosure, when one element is referred to as being "on" another element, it refers to not only a case where the element is formed directly located "on" the other element but also a case where an additional element exists between these elements.

Automotive Crash Pad

Figure 3:
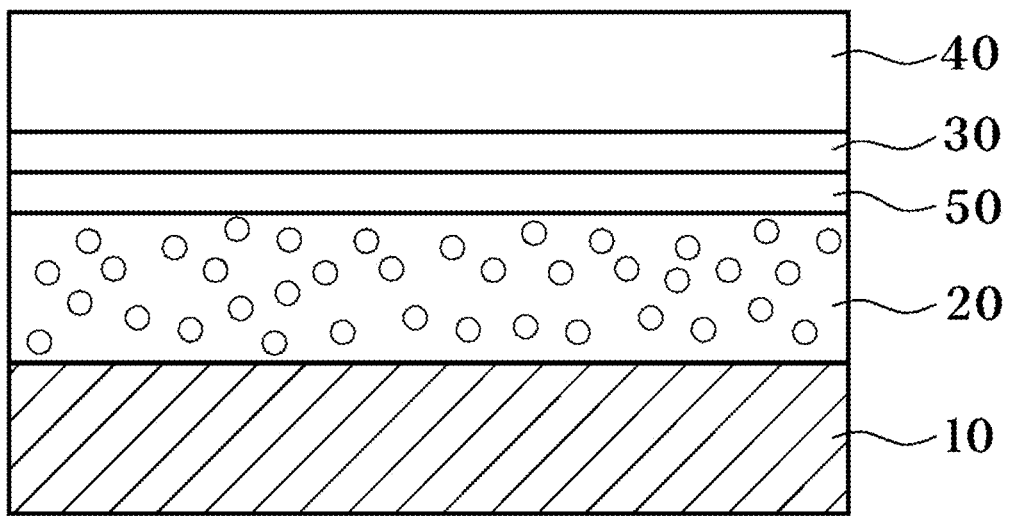
FIG. 3 illustrates a crash pad according to one embodiment of the present disclosure.

One aspect of the present disclosure is directed to an automotive crash pad. FIG. 3 illustrates a crash pad according to one embodiment of the present disclosure. Referring to FIG. 3, an automotive crash pad 200 includes: a skin layer 40 forming the outer surface of the crash pad including an airbag module; a fiber-based layer 30 formed on the lower surface of the skin layer 40; a cushion layer 20 formed on the lower surface of the fiber-based layer 30 and including slab foam; and a core layer 10 formed on the lower surface of the cushion layer 20.

A laminate of the skin layer and the fiber-based layer has a tensile strength in transverse direction (TD) of 5 to 50 kgf/3 cm and an elongation at break in transverse direction (TD) of 40 to 220%.

Skin Layer

The skin layer 40 forms the appearance of the crash pad 200, and may give a user sensitivity, such as tactile sensation and cushion feeling.

In one embodiment, the skin layer 40 may have a thickness of 0.1 to 0.7 mm. Within this thickness range, the airbag may be easily deployed through the skin layer in the event of an external shock, even when the skin layer is not subjected to a skin layer-weakening process such as scoring or skiving, and the skin layer may have excellent mechanical properties. For example, the skin layer may have a thickness of 0.1 to 0.4 mm. For example, the skin layer 40 may have a thickness of 0.1, 0.2, 0.3, 0.4, 0.5, 0.6 or 0.7 mm.

In one embodiment, a laminate of the skin layer and the fiber-based layer may have a tensile strength in transverse direction (TD) of 5 to 50 kgf/3 cm and an elongation at break in transverse direction (TD) of 40 to 220%. For example, a laminate of the skin layer having a thickness of 0.1 to 0.7 mm and the fiber-based layer having a thickness of 0.01 to 1 mm may have a tensile strength in transverse direction (TD) of 5 to 50 kgf/3 cm and an elongation at break in transverse direction (TD) of 40 to 220%, as measured at a test speed of 200 mm/min using an Instron UTM instrument according to Hyundai Motors Specification MS300-31.

If the laminate of the skin layer and the fiber-based layer has the tensile strength in transverse direction (TD) of less than 5 kgf/3 cm, the laminate may be easily damaged by an external shock because the strength thereof is excessively low, and if the laminate has a tensile strength in transverse direction of greater than 50 kgf/3 cm, the airbag cannot be deployed unless the skin layer is subjected to the skiving or scoring process. For example, the laminate of the skin layer and the fiber-based layer may have the tensile strength in transverse direction (TD) of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 kgf/3 cm.

If the laminate of the skin layer and the fiber-based layer has the elongation at break in transvers direction (TD) of less than 40%, the airbag may be difficult to quickly deploy through the skin layer in the event of an external shock, and if the laminate has the elongation at break in transverse direction (TD) of greater than 220%, the deployment shape of the airbag may be poor. For example, the laminate of the skin layer and the fiber-based layer may have the elongation at break in transvers direction (TD) of 40, 50, 60, 70, 80, 90, 100, 110, 120, 130, 140, 150, 160, 170, 180, 190, 200, 210 or 220%.

The skin layer may have a tearing strength of 2 to 8 kgf/cm. Under this condition, the skin layer may have excellent mechanical properties, and at the same time, the airbag can easily be deployed even when the skin layer is not subjected to the skiving or scoring process. For example, the skin layer may have a tearing strength of 2, 3, 4, 5, 6, 7 or 8 kgf/cm.

In one embodiment, the skin layer may be formed to include one or more of thermoplastic polyurethane, thermoplastic polyolefin, polyvinyl chloride and thermosetting polyurethane. For example, the skin layer may include thermosetting polyurethane.

In one embodiment, the skin layer may be formed using a skin layer composition. The skin layer composition may include 65 to 75 wt % of a polyol compound, 15 to 25 wt % of an isocyanate-based curing agent, and 10 to 15 wt % of a chain extender. Under the above conditions, it is possible to easily achieve the mechanical properties of the skin layer targeted by the present disclosure.

In one embodiment, the polyol compound may include one or more of diol, triol, and polymer polyol.

In one embodiment, the diol may include one or more of ethylene glycol, diethylene glycol, butanediol and hexanediol.

In one embodiment, the triol may include one or more of glycerin, trimethylolpropane, and 1,2,3-hexanetriol.

In one embodiment, the polymer polyol may include one or more of polyolefin polyol, polyester polyol, polycaprolactone polyol, polyether polyol, and polycarbonate polyol.

In one embodiment, the polyol compound may be included in an amount of 65 to 75 wt % based on the total weight of the skin layer composition. Under this condition, the mechanical properties of the skin layer targeted by the present disclosure may be easily achieved. For example, the polyol compound may be included in an amount of 65, 66, 67, 68, 69, 70, 71, 72, 73, 74 or 75 wt %, based on the total weight of the skin layer composition.

The isocyanate-based curing agent may react with the polyol compound to form the skin layer. In one embodiment, the isocyanate-based curing agent may include one or more of 4,4'-dicyclohexylmethane diisocyanate, 4,4-dimethylphenylmethane diisocyanate, bis-4-(isocyanate cyclohexyl) methane, hexamethylene diisocyanate, xylene diisocyanate, p-phenylene diisocyanate, tolidine diisocyanate, tetramethylene diisocyanate, dimethyl diisocyanate, trimethyl hexamethylene diisocyanate, phenylene diisocyanate, and dimethyl diphenyl diisocyanate.

In one embodiment, the isocyanate-based curing agent may be included in an amount of 15 to 25 wt % based on the total weight of the skin layer composition. Under this condition, the mechanical properties of the skin layer targeted by the present disclosure may be easily achieved. For example, the isocyanate-based curing agent may be included in an amount of 15, 16, 17, 18, 19, 20, 21, 22, 23, 24 or 25 wt %, based on the total weight of the skin layer composition.

The chain extender may be included for the purpose of chain-extending or crosslinking the polyurethane formed in the skin layer to increase the molecular weight of the polyurethane and improve mechanical properties, heat resistance and chemical resistance.

In one embodiment, the chain extender may include one or more of diol, triol, and amine compounds. For example, the chain extender may include one or more of ethylene glycol, propylene glycol, 1,4-butanediol, glycerin, diethanolamine (DEOA), and triethanolamine (TEOA).

In one embodiment, the chain extender may be included in an amount of 10 to 15 wt % based on the total weight of the skin layer composition. Under this condition, the mechanical properties of the skin layer targeted by the present disclosure may be easily achieved. For example, the chain extender may be included in an amount of 10, 11, 12, 13, 14 or 15 wt %, based on the total weight of the skin layer composition.

In one embodiment, the skin layer may not be subjected to a skiving or scoring process. The crash pad of the present disclosure allows the airbag to easily be deployed in the event of an external shock even when the skin layer-weakening process (skiving or scoring process) is not performed. Thus, under the above-described conditions, the skin layer-weakening process may be eliminated, and thus the number of processes can be reduced and excellent economic efficiency can be obtained.

Fiber-Based Layer

The fiber-based layer 30 is included for the purpose of improving the tactile sensation, cushion feeling and appearance of the crash pad of the present disclosure. In one embodiment, the fiber-based layer 30 may include one or more of polyethylene terephthalate (PET) and polyamide (PA). When the fiber-based layer is included, the tactile sensation and appearance of the crash pad of the present disclosure may be excellent.

In one embodiment, the fiber-based layer 30 may be in the form of a knitted or nonwoven fabric. For example, it may be in the form of a knitted fabric. When the fiber-based layer 30 is in this form, the crash pad may have excellent tactile sensation and cushion feeling, and the airbag can be easily deployed through the skin layer in the event of an external shock.

For example, the fiber-based layer may be in the form of a knitted fabric including PET fiber, and may have a weight of 150 to 200 g/m2 and a fineness of 20 denier to 500 denier. Under these conditions, the crash pad may have excellent lightweight properties, tactile sensation and cushion feeling, and the airbag can be easily deployed in the event of an external shock.

In one embodiment, the fiber-based layer 30 may have a density of 0.22 to 0.27 g/cm3 and a thickness of 0.01 to 1 mm. within the density and thickness ranges, the crash pad may have excellent tactile sensation and cushion feeling, the airbag can be easily deployed through the skin layer in the event of an external shock, and the fiber-based layer may have excellent mechanical properties. For example, the fiber-based layer may have a density of 0.22, 0.23, 0.24, 0.25, 0.26 or 0.27 g/cm3. For example, the fiber-based layer 30 may have a thickness of 0.3 to 0.7 mm.

Surface Treatment Layer

In one embodiment, the crash pad may further include a surface treatment layer formed on the skin layer. The surface treatment layer may be included for the purpose of improving functions such as light stability and antifouling properties while controlling the gloss of the skin layer and expressing color.

In one embodiment, the surface treatment layer may include a polyurethane resin. For another example, the surface treatment layer may be formed by applying and curing a water-dispersible polyurethane resin composition. In one embodiment, the water-dispersible polyurethane resin may include a polyol compound, a chain extender, an isocyanate-based curing agent, and water, but is not limited thereto.

In one embodiment, the thickness of the surface treatment layer may be 1 to 200 μm. Within this thickness range, the crash pad may have excellent appearance, light stability and antifouling properties.

First Adhesive Layer

Referring to FIG. 3, the crash pad 200 may further include a first adhesive layer 50 between the fiber-based layer 30 and the cushion layer 20. When the first adhesive layer 50 is included, adhesion between the fiber-based layer and the cushion layer may be improved.

The first adhesive layer 50 may include polyurethane. For example, it may include organic solvent-type polyurethane or water-dispersible polyurethane. In one embodiment, the first adhesive layer may be formed using a first adhesive composition. For example, the first adhesive composition may include a polyol compound, an isocyanate-based curing agent, and a solvent.

In one embodiment, the polyol compound may include one or more of diol, triol and polymer polyol.

In one embodiment, the diol may include one or more of ethylene glycol, diethylene glycol, butanediol, and hexanediol.

In one embodiment, the triol may include one or more of glycerin, trimethylolpropane, and 1,2,3-hexanetriol.

In one embodiment, the polymer polyol may include one or more of polyolefin polyol, polyester polyol, polycaprolactone polyol, polyether polyol, and polycarbonate polyol.

The isocyanate-based curing agent may react with the polyol compound to form the first adhesive layer. In one embodiment, the isocyanate-based curing agent may include one or more of 4,4'-dicyclohexylmethane diisocyanate, 4,4-dimethylphenylmethane diisocyanate, bis-4-(isocyanate cyclohexyl)methane, hexamethylene diisocyanate, xylene diisocyanate, p-phenylene diisocyanate, tolidine diisocyanate, tetramethylene diisocyanate, dimethyl diisocyanate, trimethyl hexamethylene diisocyanate, phenylene diisocyanate, and dimethyl diphenyl diisocyanate.

In one embodiment, the solvent may include one or more of water, an alcohol having 1 to 10 carbon atoms, toluene, acetone, methyl ethyl ketone, dimethylformamide, and cyclohexane.

In one embodiment, the adhesive strength between a laminate of the skin layer and the fiber-based layer and the cushion layer may be 0.3 kgf/cm or more, as measured according to the ISO 813 standard. The adhesive strength may be a result obtained by measuring the adhesive strength between the skin layer/fiber-based layer laminate and the cushion layer according to Hyundai-Kia Motors MS Specification 256-29 (ISO 813 standard; 90° peeling method; peeling speed: 25 mm/min). If the adhesive strength is less than 0.3 kgf/cm, the adhesion between the laminate and the first adhesive layer (cushion layer) may be poor, and the tear shape of the airbag may be poor. For example, the adhesive strength may be 0.3 to 1.2 kgf/cm. For example, it may be 0.3, 0.4, 0.5, 0.6, 0.7, 0.8, 0.9, 1, 1.1 or 1.2 kgf/cm.

In one embodiment, the laminate of the skin layer and the fiber-based layer may have an adhesive strength of 0.3 kgf/cm or more to the first adhesive layer, as measured according to the ISO 813 standard. The adhesive strength may be a result obtained by measuring the adhesive strength between the skin layer/fiber-based layer laminate and the first adhesive layer according to Hyundai-Kia Motors MS Specification 256-29 (ISO 813 standard; 90° peeling method; peeling speed: 25 mm/min). If the adhesive strength is less than 0.3 kgf/cm, the adhesion between the laminate and the first adhesive layer (cushion layer) may be poor, and the tear shape of the airbag may be poor. For example, the adhesive strength may be 0.3 to 1.2 kgf/cm. For example, it may be 0.3, 0.4, 0.5, 0.6, 0.7, 0.8, 0.9, 1, 1.1 or 1.2 kgf/cm.

In one embodiment, the thickness of the first adhesive layer 50 may be 30 to 300 μm. Within this thickness range, the first adhesive layer may have excellent adhesion, and at the same time, the airbag can be easily deployed through the skin layer in the event of an external shock.

Cushion Layer

The cushion layer functions to secure the physical properties of the crash pad, such as heat resistance, impact resistance and light stability, and to impart tactile sensation such as cushion feeling to the driver and the passenger.

In one embodiment, the cushion layer includes slab foam. When the slab foam is included, the cushion layer may have excellent airbag deployment performance and cushion feeling compared to a conventional filament layer, and have excellent economic efficiency because of being cheaper than the conventional filament layer, and the airbag can be easily deployed in the event of an external shock while the airbag module is prevented from damage.

In one embodiment, the slab foam may be formed by foaming a first composition including a polyol compound, an isocyanate-based curing agent and a foaming agent.

In one embodiment, the polyol compound may include one or more of diol, triol, and polymer polyol.

In one embodiment, the diol may include one or more of ethylene glycol, diethylene glycol, butanediol, and hexanediol.

In one embodiment, the triol may include one or more of glycerin, trimethylolpropane, and 1,2,3-hexanetriol.

In one embodiment, the polymer polyol may include one or more of polyolefin polyol, polyester polyol, polycaprolactone polyol, polyether polyol, and polycarbonate polyol.

In one embodiment, the polyol compound may be included in an amount of 40 to 75 wt % based on the total weight of the first composition. When the polyol compound is included in an amount within the above range, the slab foam may have excellent mechanical strength. For example, the polyol compound may be included in an amount of 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 or 75 wt %, based on the total weight of the first composition.

The isocyanate-based curing agent may react with the polyol compound to form the slab foam. In one embodiment, the isocyanate-based curing agent may include one or more of 4,4'-dicyclohexylmethane diisocyanate, 4,4-dimethylphenylmethane diisocyanate, bis-4-(isocyanate cyclohexyl) methane, hexamethylene diisocyanate, xylene diisocyanate, p-phenylene diisocyanate, tolidine diisocyanate, tetramethylene diisocyanate, dimethyl diisocyanate, trimethyl hexamethylene diisocyanate, phenylene diisocyanate, and dimethyl diphenyl diisocyanate.

In one embodiment, the isocyanate-based curing agent may be included in an amount of 15 to 45 wt % based on the total weight of the first composition. When the isocyanate-based curing agent is included in an amount within this range, the slab foam may have excellent mechanical strength. For example, the isocyanate-based curing agent may be included in an amount of 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt %, based on the total weight of the first composition.

The foaming agent may include one or more of water, butane, n-pentane, c-pentane, hexane, heptane, chlorofluorocarbon (CFC 11), hydrogen chlorofluorocarbons (H-CFCs), hydrogen fluorocarbons (H-FCs), trichlorofluoromethane (Freon 11), chlorodifluoromethane (R-22), 1,1-dichloro-1-fluoroethane (HCFC-141b), and 1,1,1,3,3-pentafluoropropane (HFC-245fa).

In one embodiment, the foaming agent may be included in an amount of 1 to 15 wt % based on the total weight of the first composition. When the foaming agent is included in an amount within this range, the slab foam may have excellent mechanical strength. For example, the foaming agent may be included in an amount of 1, 2, 3, 4, 5, 6, 7, 8, 9, 10, 11, 12, 13, 14 or 15 wt %, based on the total weight of the first composition.

In one embodiment, the cushion layer may have a density of 0.05 to 5 g/cm3 and a porosity of 5 to 80%. Under these conditions, the crash pad may have excellent lightweight and mechanical strength properties.

In one embodiment, the cushion layer may have a tensile strength of 3 to 20 kgf/cm2, an elongation of 50 to 200% and a tearing strength of 0.2 to 1.5 kgf/cm, as measured according to Hyundai Motors Specification MS300-31. Under these tensile strength, elongation and tearing strength conditions, the cushion layer may have excellent physical properties, and at the same time, the air bag can be easily deployed through the cushion layer in the event of an external shock.

For example, the cushion layer may have a tensile strength of 3, 4, 5, 6, 7, 8, 9, 10, 11, 12, 13, 14, 15, 16, 17, 18, 19 or 20 kgf/cm2, as measured according to Hyundai Motors Specification MS300-31, an elongation of 50, 60, 70, 80, 90, 100, 110, 120, 130, 140, 150, 160, 170, 180, 190 or 200%, as measured according to Hyundai Motors Specification MS300-31, and a tearing strength of 0.2. 0.3, 0.4, 0.5, 0.6, 0.7, 0.8, 0.9, 1, 1.1, 1.2, 1.3, 1.4 or 1.5 kgf/cm, as measured according to Hyundai Motors Specification MS300-31.

For example, the cushion layer may have a thickness of 1 to 10 mm. When the cushion layer is formed to have this thickness, the cushion layer may have excellent physical properties, such as heat resistance, impact resistance and light stability, and the airbag deployment performance in the event of an external shock may be excellent. For another example, the cushion layer may have a thickness of 1 to 5 mm. For example, the cushion layer may have a thickness of 1, 2, 3, 4, 5, 6, 7, 8, 9 or 10 mm.

Second Adhesive Layer

Figure 4:
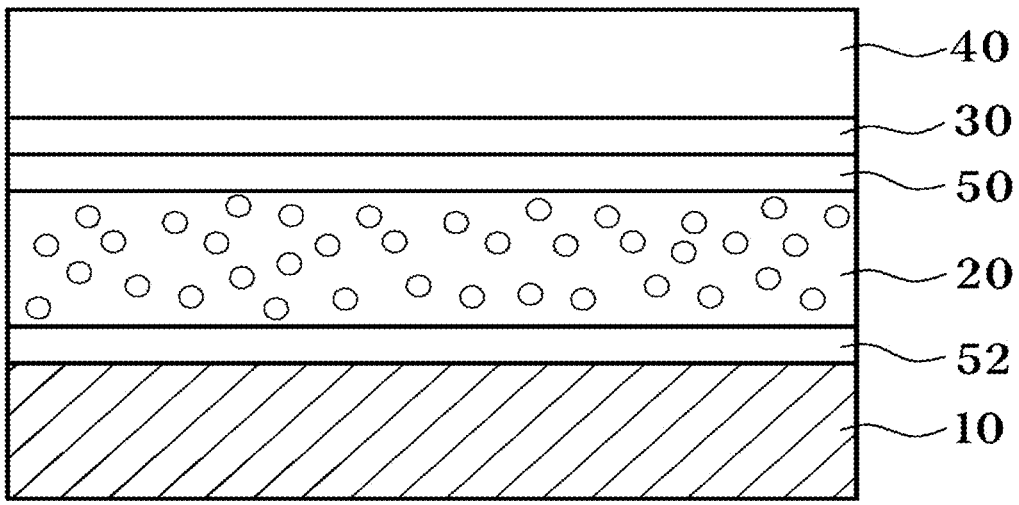
FIG. 4 illustrates a crash pad according to another embodiment of the present disclosure.

FIG. 4 illustrates a crash pad according to another embodiment of the present disclosure. Referring to FIG. 4, a crash pad 300 may further include a second adhesive layer 52 formed between the cushion layer 20 and the core layer 10. When the second adhesive layer 52 is included, the adhesion between the cushion layer 20 and the core layer 10 may be improved.

The second adhesive layer 52 may include polyurethane. For example, the second adhesive layer 52 may include organic solvent-type polyurethane or water-dispersible polyurethane. In one embodiment, the second adhesive layer may be formed using a second adhesive composition. For example, the second adhesive composition may include a polyol compound, an isocyanate-based curing agent, and a solvent. The polyol compound, the isocyanate-based curing agent and the solvent may be the same as those of the first adhesive composition.

In one embodiment, the thickness of the second adhesive layer may be 30 to 300 Within this thickness range, the second adhesive layer may have excellent adhesion, and at the same time, the airbag can be easily deployed through the skin layer in the event of an external shock.

Core Layer

The core layer 10 forms the front of the driver's seat and the passenger's seat and functions to protect the driver and the passenger from an external shock when a crash or rollover accident occurs. In addition, the core layer 10 may have an insertion hole through which an airbag module is mounted, a mounting portion to which an air conditioner is mounted, etc.

In one embodiment, the core layer may include a matrix resin and an inorganic filler. For example, the matrix resin may include one or more of a polyolefin-based resin, a polycarbonate-based resin, and a styrene-based resin. The styrene-based resin may include an acrylonitrile-butadiene-styrene (ABS) resin. In one embodiment, the matrix resin may include one or more of a polypropylene resin and a PC/ABS resin.

In one embodiment, the inorganic filler may include one or more of talc, whisker, glass fiber, carbon fiber, basalt fiber, and polymer fiber.

In one embodiment, the thickness of the core layer may be 1 to 6 mm. When the core layer is formed to have this thickness, it may have excellent impact resistance, and the airbag deployment performance in the event of an external shock may be excellent. For example, the core layer may have a thickness of 3 to 4 mm. For example, the thickness of the core layer may be 1, 2, 3, 4, 5 or 6 mm.

In one embodiment, the core layer may include an airbag door portion through which the airbag is deployed. The airbag door portion may have a tear line for airbag deployment formed therein, and the tear line may have any one shape selected from among an "X" shape, a modified "X" shape, a "—" shape, an "H" shape, and a "U" shape. When the tear line is formed in this shape, the airbag can be easily deployed in the event of an external shock.

Primer Layer

In one embodiment, the crash pad may further include a primer layer (not shown) formed between the second adhesive layer and the core layer. When the primer layer is formed, the adhesion between the second adhesive layer and the core layer may be excellent.

In one embodiment, the thickness of the primer layer may be 5 to 500 μm. When the primer layer is formed to have this thickness, the adhesion between the second adhesive layer and the core layer may be excellent.

Method for Manufacturing Automotive Crash Pad

Figure 5:
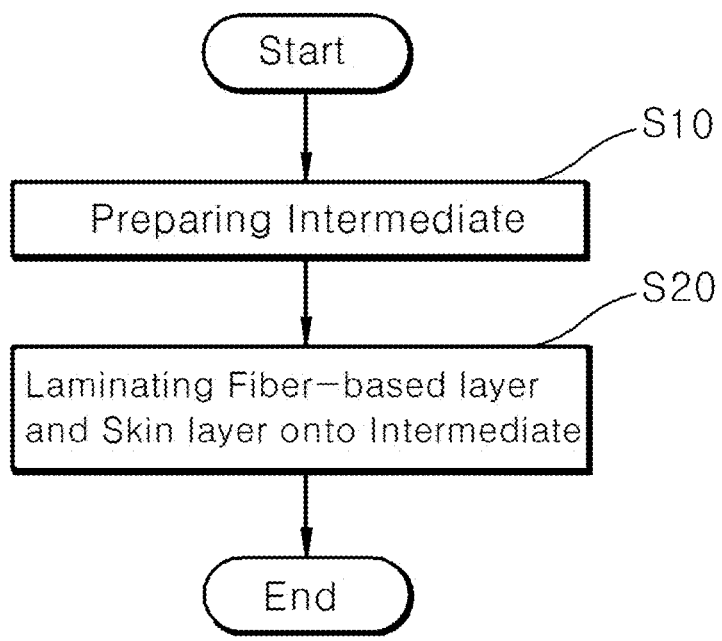
FIG. 5 illustrates a method for manufacturing an automotive crash pad according to one embodiment of the present disclosure.

Another aspect of the present disclosure is directed to a method for manufacturing an automotive crash pad. FIG. 5 illustrates a method for manufacturing an automotive crash pad according to one embodiment of the present disclosure. Referring to FIG. 5, the method for manufacturing an automotive crash pad includes steps of: (S10) preparing an intermediate; and (S20) laminating the intermediate, a fiber-based layer and a skin layer together.

More specifically, the method for manufacturing an automotive crash pad includes steps of: (S10) preparing an intermediate by laminating a cushion layer and a core layer together; and (S20) laminating a fiber-based layer and a skin layer onto the intermediate, wherein a laminate of the skin layer and the fiber-based layer has a tensile strength in transverse direction (TD) of 5 to 50 kgf/3 cm and an elongation at break in transverse direction (TD) of 40 to 220%.

Hereinafter, each step of the method for manufacturing an automotive crash pad will be described in detail.

(S10) Step of Preparing Intermediate

This step is a step of preparing an intermediate by laminating a cushion layer and a core layer together. The cushion layer and the core layer that are used here may be the same as those described above.

In one embodiment, the cushion layer may have a thickness of 1 to 10 mm. When the cushion layer is formed to have this thickness, it may have excellent physical properties such as heat resistance, impact resistance and light stability, and the airbag deployment performance in the event of an external shock may be excellent. For another example, the thickness may be 1 to 5 mm.

The cushion layer includes slab foam. In one embodiment, the slab foam may be formed by foaming a first composition including a polyol, an isocyanate-based curing agent and a foaming agent.

In one embodiment, the core layer may have a thickness of 1 to 6 mm. When the core layer is formed to have this thickness, it may have excellent impact resistance, and at the same time, the airbag deployment performance in the event of an external shock may be excellent. For example, the thickness may be 3 to 4 mm.

In one embodiment, the cushion layer and the core layer may be laminated together by forming a second adhesive layer between the cushion layer and the core layer. For example, the cushion layer and the core layer may be laminated together by applying a second adhesive composition to one or more of the lower surface of the cushion layer and the upper surface of the core layer and curing the applied composition to form the second adhesive layer. The second adhesive composition that is used here may be the same as that described above.

In one embodiment, a primer layer (not shown) formed between the second adhesive layer and the core layer may be further included. When the primer layer is formed, the adhesion between the second adhesive layer and the core layer may be excellent.

In one embodiment, the cushion layer and the core layer may be laminated together by applying a primer to the surface of the core layer, drying the applied primer to form a primer layer, applying the second adhesive composition to each of the surface of the primer layer and the surface of the cushion layer to be laminated, and heating the applied composition. When the primer layer is formed, the adhesion between the second adhesive layer and the core layer may be excellent.

In one embodiment, the primer layer may have a thickness of 5 to 500 μm. When the primer layer is formed to have this thickness, the adhesion between the second adhesive layer and the core layer may be excellent.

(S20) Step of Laminating Intermediate, Fiber-Based Layer and Skin Layer Together This step is a step of laminating a fiber-based layer and a skin layer onto the intermediate. The fiber-based layer and the skin layer that are used here may be the same as those described above.

The skin layer may be formed using a skin layer composition including 65 to 75 wt % of a polyol compound, 15 to 25 wt % of an isocyanate-based curing agent, and 10 to 15 wt % of a chain extender.

In one embodiment, a laminate of the skin layer and the fiber-based layer have a tensile strength in transverse direction (TD) of 5 to 50 kgf/3 cm and an elongation at break in transverse direction (TD) of 40 to 220%. For example, a laminate of the skin layer having a thickness of 0.1 to 0.7 mm and the fiber-based layer having a thickness of 0.01 to 1 mm may have a tensile strength in transverse direction (TD) of 5 to 50 kgf/3 cm and an elongation at break in transverse direction (TD) of 40 to 220%, as measured at a test speed of 200 mm/min using an Instron UTM instrument according to Hyundai Motors Specification MS300-31.

If the laminate of the skin layer and the fiber-based layer has the tensile strength in transverse direction (TD) of less than 5 kgf/3 cm, the laminate may be easily damaged by an external shock because the strength thereof is excessively low, and if the laminate has a tensile strength in transverse direction (TD) of greater than 50 kgf/3 cm, the airbag cannot be deployed unless the skin layer is subjected to the skiving or scoring process.

If the laminate of the skin layer and the fiber-based layer has the elongation at break in transvers direction (TD) of less than 40%, the airbag may be difficult to quickly deploy through the skin layer in the event of an external shock, and if the laminate has the elongation at break in transverse direction (TD) of greater than 220%, the deployment shape of the airbag may be poor.

In one embodiment, the skin layer may have a thickness of 0.1 to 0.7 mm. Within this thickness range, the airbag can be easily deployed through the skin layer in the event of an external shock, even when the skin layer is not subjected to a skin layer-weakening process such as scoring or skiving, and the skin layer may have excellent mechanical properties.

In one embodiment, the skin layer may be formed by preparing two or more skin layer materials and then sewing the materials through single-needle stitching or double-needle stitching.

In one embodiment, the fiber-based layer may have a thickness of 0.3 to 0.7 mm. Within this thickness range, the crash pad may have excellent tactile sensation and cushion feeling, the airbag can be easily deployed through the skin layer in the event of an external shock, and the crash pad may have excellent physical properties.

In one embodiment, the fiber-based layer and the skin layer may be sequentially laminated onto one surface of the cushion layer of the intermediate.

In one embodiment, in the step of laminating the fiber-based layer and the skin layer onto the intermediate, the laminating may be achieved by forming a first adhesive layer between the fiber-based layer and the cushion layer. For example, the laminating may be achieved by applying a first adhesive composition to one or more of the lower surface of the fiber-based layer and the upper surface of the cushion layer and curing the applied composition to form the first adhesive layer. The first adhesive composition that is used here may be the same as that described above.

In one embodiment, the first adhesive layer may have a thickness of 30 to 300 Within this thickness range, the first adhesive layer may have excellent adhesion, and at the same time, the airbag can be easily deployed through the skin layer in the event of an external shock.

In one embodiment, a surface treatment layer may be further formed on the upper surface of the skin layer. The surface treatment layer may include a polyurethane resin. For another example, the surface treatment layer may be formed by applying a water-dispersible polyurethane resin composition to the upper surface of the skin layer and curing the applied composition. The surface treatment layer that is used here may be the same as that described above.

In one embodiment, the surface treatment layer may have a thickness of 1 to 200 Within this thickness range, the crash pad may have excellent appearance, light stability and antifouling properties.

(S30) Covering Step

In one embodiment, the method may further include a step of covering the fiber-based layer, the cushion layer and the core layer with the skin layer, after the step of laminating the fiber-based layer and the skin layer onto the intermediate.

In the present disclosure, the covering means a process of covering the fiber-based layer, the cushion layer and the core layer with the skin layer.

In one embodiment, after the intermediate, the fiber-based layer and the skin layer are laminated together and then the laminated intermediate, fiber-based layer and skin layer are pressed using a compression mold or the like, the fiber-based layer and the intermediate may be covered with the skin layer.

In one embodiment, the skin layer may not be subjected to a skiving or scoring process. The crash pad of the present disclosure allows the airbag to be easily deployed in the event of an external shock even when the skin layer-weakening process (skiving or scoring process) is not performed. Thus, under the above-described conditions, the skin layer-weakening process may be eliminated, and thus the number of processes can be reduced and excellent economic efficiency can be obtained.

In another embodiment of the present disclosure, the method for manufacturing a crash pad may include steps of: (S11) preparing a laminate; (S21) laminating the laminate and a core layer together; and (S31) covering.

(S11) Step of Preparing Laminate

This step is a step of preparing a laminate by laminating a skin layer, a fiber-based layer and a cushion layer together. The skin layer, fiber-based layer and cushion layer that are used here may be the same as those described above.

In one embodiment, the laminate may be prepared by sequentially laminating the fiber-based layer and the cushion layer on the lower surface of the skin layer. In one embodiment, in the step of preparing the laminate, the laminating may be achieved by forming a first adhesive layer between the fiber-based layer and the cushion layer. For example, the laminating may be achieved by applying a first adhesive composition to one or more of the lower surface of the fiber-based layer and the upper surface of the cushion layer and curing the applied composition to form the first adhesive layer. The first adhesive composition that is used here may be the same as that described above.

In one embodiment, the first adhesive layer may have a thickness of 30 to 300 μm. Within this thickness range, the first adhesive layer may have excellent adhesion, and at the same time, the airbag can be easily deployed through the skin layer in the event of an external shock.

In one embodiment, a surface treatment layer may be further formed on the upper surface of the skin layer. The surface treatment layer may include a polyurethane resin. For another example, the surface treatment layer may be formed by applying a water-dispersible polyurethane resin composition to the upper surface of the skin layer and curing the applied composition. The surface treatment layer that is used here may be the same as that described above.

In one embodiment, the surface treatment layer may have a thickness of 1 to 200 Within this thickness range, the crash pad may have excellent appearance, light stability and antifouling properties.

(S21) Step of Laminating Laminate and Core Layer Together

This step is a step of laminating the laminate and a core layer together. The core layer that is used here may be the same as that described above.

In one embodiment, the thickness of the core layer may be 1 to 6 mm. When the core layer is formed to have this thickness, it may have excellent impact resistance, and at the same time, the airbag deployment performance in the event of an external shock may be excellent. For example, the thickness thereof may be 3 to 4 mm.

In one embodiment, in the step of laminating the laminate and the core layer together, the laminating may be achieved by forming a second adhesive layer between the cushion layer of the stack and the core layer. For example, the laminating may be achieved by applying a second adhesive composition to one or more of the lower surface of the cushion layer of the laminate and the upper surface of the core layer and curing the applied composition to form the second adhesive layer. The second adhesive composition that is used here may be the same as that described above.

In one embodiment, the thickness of the second adhesive layer may be 30 to 300 Within this thickness range, the second adhesive layer may have excellent adhesion, and at the same time, the airbag can be easily deployed through the skin layer in the event of an external shock.

In one embodiment, the laminate and the core layer may be laminated together by applying a primer to the surface of the core layer, drying the applied primer to form a primer layer, applying the second adhesive composition to each of the surface of the primer layer and the surface of the cushion layer to be laminated, and heating the applied composition. When the primer layer is formed, the adhesion between the core layer and the second adhesive layer may be excellent.

In one embodiment, the primer layer may have a thickness of 5 to 500 μm. When the primer layer is formed to have this thickness, the adhesion between the second adhesive layer and the core layer may be excellent.

(S31) Covering Step

In one embodiment, the method may further include a step of covering the fiber-based layer, the cushion layer and the core layer with the skin layer, after the step of laminating the laminate and the core layer together.

In the present disclosure, the covering means a process of bringing the lower surface of the cushion layer of the laminate into contact with the upper surface of the core layer, and then covering the cushion layer and the core layer with the skin layer of the laminate.

In one embodiment, after the laminate and the core layer are laminated together and the laminated laminate and core layer are pressed using a compression mold or the like, the fiber-based layer, the cushion layer and the core layer may be covered with the skin layer.

In one embodiment, the skin layer may not be subjected to a skiving or scoring process. The crash pad of the present disclosure allows the airbag to be easily deployed even when the skin layer-weakening process (skiving or scoring process) is not performed. Thus, under the above-described conditions, the skin layer-weakening process may be eliminated, and thus the number of processes can be reduced and excellent economic efficiency can be obtained.

Hereinafter, the configuration and effects of the present disclosure will be described in more detail with reference to preferred examples. However, these examples are presented as preferred examples of the present disclosure and may not be construed as limiting the scope of the present disclosure in any sense. The contents that are not described herein can be sufficiently and technically envisioned by those skilled in the art, and thus the description thereof will be omitted herein.

Examples and Comparative Examples

Example 1

(1) Preparation of intermediate: A 1 to 6-mm-thick core layer including polypropylene was prepared. In addition, a cushion layer including slab foam was prepared, which was formed by foaming a first composition including 40 to 75 wt % of a polyol compound, 15 to 45 wt % of an isocyanate-based curing agent and 1 to 15 wt % of a foaming agent.

A primer was applied to the upper surface of the core layer and dried to form a primer layer (thickness: 5 to 10 μm).

A second adhesive composition including polyurethane was applied to each of the lower surface of the cushion layer and the upper surface of the primer layer to form a second adhesive layer (thickness: 1 to 15 μm) including water-dispersible polyurethane, and then the lower surface of the cushion layer and the upper surface of the primer layer were heat-cured and laminated together, thereby preparing an intermediate.

(2) Lamination of fiber-based layer and skin layer onto intermediate: A skin layer material was formed according to a conventional method using a skin layer composition including 65 to 75 wt % of a polyol compound, 15 to 25 wt % of an isocyanate-based curing agent and 10 to 15 In the following description, the detailed description of related publicly-known technology or configuration will be omitted when it may unnecessarily obscure the subject matter of the present disclosure.

In addition, the terms used in the following description are terms defined considering the functions in the present disclosure, and may be changed in accordance with the option of a user or operator or a usual practice. Accordingly, the definition of the terms should be made based on the contents throughout the present specification.

In the present specification, the terms "upper portion" and "lower portion" are defined based on the drawings, and depending on the point of view, "upper portion" may be changed to "lower portion" and "lower portion" may be changed to "upper portion". In addition, in the present disclosure, when one element is referred to as being "on" another element, it refers to not only a case where the element is formed directly located "on" the other element but also a case where an additional element exists between these elements.

Automotive Crash Pad

One aspect of the present disclosure is directed to an automotive crash pad. FIG. 3 illustrates a crash pad according to one embodiment of the present disclosure. Referring to FIG. 3, an automotive crash pad 200 includes: a skin layer 40 forming the outer surface of the crash pad including an airbag module; a fiber-based layer 30 formed on the lower surface of the skin layer 40; a cushion layer 20 formed on the lower surface of the fiber-based layer 30 and including slab foam; and a core layer 10 formed on the lower surface of the cushion layer 20.

A laminate of the skin layer and the fiber-based layer has a tensile strength in transverse direction (TD) of 5 to 50 kgf/3 cm and an elongation at break in transverse direction (TD) of 40 to 220%.

Skin Layer

The skin layer 40 forms the appearance of the crash pad 200, and may give a user sensitivity, such as tactile sensation and cushion feeling.

In one embodiment, the skin layer 40 may have a thickness of 0.1 to 0.7 mm. Within this thickness range, the airbag may be easily deployed through the skin layer in the event of an external shock, even when the skin layer is not subjected to a skin layer-weakening process such as scoring or skiving, and the skin layer may have excellent mechanical properties. For example, the skin layer may have a thickness of 0.1 to 0.4 mm. For example, the skin layer 40 may have a thickness of 0.1, 0.2, 0.3, 0.4, 0.5, 0.6 or 0.7 mm.

In one embodiment, a laminate of the skin layer and the fiber-based layer may have a tensile strength in transverse direction (TD) of 5 to 50 kgf/3 cm and an elongation at break in transverse direction (TD) of 40 to 220%. For example, a laminate of the skin layer having a thickness of 0.1 to 0.7 mm and the fiber-based layer having a thickness of 0.01 to 1 mm may have a tensile strength in transverse direction (TD) of 5 to 50 kgf/3 cm and an elongation at break in transverse direction (TD) of 40 to 220%, as measured at a test speed of 200 mm/min using an Instron UTM instrument according to Hyundai Motors Specification MS300-31.

If the laminate of the skin layer and the fiber-based layer has the tensile strength in transverse direction (TD) of less than 5 kgf/3 cm, the laminate may be easily damaged by an external shock because the strength thereof is excessively low, and if the laminate has a tensile strength in transverse direction of greater than 50 kgf/3 cm, the airbag cannot be deployed unless the skin layer is subjected to the skiving or scoring process. For example, the laminate of the skin layer and the fiber-based layer may have the tensile strength in transverse direction (TD) of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 kgf/3 cm.

If the laminate of the skin layer and the fiber-based layer has the elongation at break in transvers direction (TD) of less than 40%, the airbag may be difficult to quickly deploy through the skin layer in the event of an external shock, and if the laminate has the elongation at break in transverse direction (TD) of greater than 220%, the deployment shape of the airbag may be poor. For example, the laminate of the skin layer and the fiber-based layer may have the elongation at break in transvers direction (TD) of 40, 50, 60, 70, 80, 90, 100, 110, 120, 130, 140, 150, 160, 170, 180, 190, 200, 210 or 220%.

The skin layer may have a tearing strength of 2 to 8 kgf/cm. Under this condition, the skin layer may have excellent mechanical properties, and at the same time, the airbag can easily be deployed even when the skin layer is not subjected to the skiving or scoring process. For example, the skin layer may have a tearing strength of 2, 3, 4, 5, 6, 7 or 8 kgf/cm.

In one embodiment, the skin layer may be formed to include one or more of thermoplastic polyurethane, thermoplastic polyolefin, polyvinyl chloride and thermosetting polyurethane. For example, the skin layer may include thermosetting polyurethane.

In one embodiment, the skin layer may be formed using a skin layer composition. The skin layer composition may include 65 to 75 wt % of a polyol compound, 15 to 25 wt % of an isocyanate-based curing agent, and 10 to 15 wt % of a chain extender. Under the above conditions, it is possible to easily achieve the mechanical properties of the skin layer targeted by the present disclosure.

In one embodiment, the polyol compound may include one or more of diol, triol, and polymer polyol.

In one embodiment, the diol may include one or more of ethylene glycol, diethylene glycol, butanediol and hexanediol.

In one embodiment, the triol may include one or more of glycerin, trimethylolpropane, and 1,2,3-hexanetriol.

In one embodiment, the polymer polyol may include one or more of polyolefin polyol, polyester polyol, polycaprolactone polyol, polyether polyol, and polycarbonate polyol.

In one embodiment, the polyol compound may be included in an amount of 65 to 75 wt % based on the total weight of the skin layer composition. Under this condition, the mechanical properties of the skin layer targeted by the present disclosure may be easily achieved. For example, the polyol compound may be included in an amount of 65, 66, 67, 68, 69, 70, 71, 72, 73, 74 or 75 wt %, based on the total weight of the skin layer composition.

The isocyanate-based curing agent may react with the polyol compound to form the skin layer. In one embodiment, the isocyanate-based curing agent may include one or more of 4,4'-dicyclohexylmethane diisocyanate, 4,4-dimethylphenylmethane diisocyanate, bis-4-(isocyanate cyclohexyl) methane, hexamethylene diisocyanate, xylene diisocyanate, p-phenylene diisocyanate, tolidine diisocyanate, tetramethylene diisocyanate, dimethyl diisocyanate, trimethyl hexamethylene diisocyanate, phenylene diisocyanate, and dimethyl diphenyl diisocyanate.

In one embodiment, the isocyanate-based curing agent may be included in an amount of 15 to 25 wt % based on the total weight of the skin layer composition. Under this condition, the mechanical properties of the skin layer targeted by the present disclosure may be easily achieved. For example, the isocyanate-based curing agent may be included in an amount of 15, 16, 17, 18, 19, 20, 21, 22, 23, 24 or 25 wt %, based on the total weight of the skin layer composition.

The chain extender may be included for the purpose of chain-extending or crosslinking the polyurethane formed in the skin layer to increase the molecular weight of the polyurethane and improve mechanical properties, heat resistance and chemical resistance.

In one embodiment, the chain extender may include one or more of diol, triol, and amine compounds. For example, the chain extender may include one or more of ethylene glycol, propylene glycol, 1,4-butanediol, glycerin, diethanolamine (DEOA), and triethanolamine (TEOA).

In one embodiment, the chain extender may be included in an amount of 10 to 15 wt % based on the total weight of the skin layer composition. Under this condition, the mechanical properties of the skin layer targeted by the present disclosure may be easily achieved. For example, the chain extender may be included in an amount of 10, 11, 12, 13, 14 or 15 wt %, based on the total weight of the skin layer composition.

In one embodiment, the skin layer may not be subjected to a skiving or scoring process. The crash pad of the present disclosure allows the airbag to easily be deployed in the event of an external shock even when the skin layer-weakening process (skiving or scoring process) is not performed. Thus, under the above-described conditions, the skin layer-weakening process may be eliminated, and thus the number of processes can be reduced and excellent economic efficiency can be obtained.

Fiber-Based Layer

The fiber-based layer 30 is included for the purpose of improving the tactile sensation, cushion feeling and appearance of the crash pad of the present disclosure. In one embodiment, the fiber-based layer 30 may include one or more of polyethylene terephthalate (PET) and polyamide (PA). When the fiber-based layer is included, the tactile sensation and appearance of the crash pad of the present disclosure may be excellent.

In one embodiment, the fiber-based layer 30 may be in the form of a knitted or nonwoven fabric. For example, it may be in the form of a knitted fabric. When the fiber-based layer 30 is in this form, the crash pad may have excellent tactile sensation and cushion feeling, and the airbag can be easily deployed through the skin layer in the event of an external shock.

For example, the fiber-based layer may be in the form of a knitted fabric including PET fiber, and may have a weight of 150 to 200 g/m2 and a fineness of 20 denier to 500 denier. Under these conditions, the crash pad may have excellent lightweight properties, tactile sensation and cushion feeling, and the airbag can be easily deployed in the event of an external shock.

In one embodiment, the fiber-based layer 30 may have a density of 0.22 to 0.27 g/cm3 and a thickness of 0.01 to 1 mm. within the density and thickness ranges, the crash pad may have excellent tactile sensation and cushion feeling, the airbag can be easily deployed through the skin layer in the event of an external shock, and the fiber-based layer may have excellent mechanical properties. For example, the fiber-based layer may have a density of 0.22, 0.23, 0.24, 0.25, 0.26 or 0.27 g/cm3. For example, the fiber-based layer 30 may have a thickness of 0.3 to 0.7 mm.

Surface Treatment Layer

In one embodiment, the crash pad may further include a surface treatment layer formed on the skin layer. The surface treatment layer may be included for the purpose of improving functions such as light stability and antifouling properties while controlling the gloss of the skin layer and expressing color.

In one embodiment, the surface treatment layer may include a polyurethane resin. For another example, the surface treatment layer may be formed by applying and curing a water-dispersible polyurethane resin composition. In one embodiment, the water-dispersible polyurethane resin may include a polyol compound, a chain extender, an isocyanate-based curing agent, and water, but is not limited thereto.

In one embodiment, the thickness of the surface treatment layer may be 1 to 200 μm. Within this thickness range, the crash pad may have excellent appearance, light stability and antifouling properties.

First Adhesive Layer

Referring to FIG. 3, the crash pad 200 may further include a first adhesive layer 50 between the fiber-based layer 30 and the cushion layer 20. When the first adhesive layer 50 is included, adhesion between the fiber-based layer and the cushion layer may be improved.

The first adhesive layer 50 may include polyurethane. For example, it may include organic solvent-type polyurethane or water-dispersible polyurethane. In one embodiment, the first adhesive layer may be formed using a first adhesive composition. For example, the first adhesive composition may include a polyol compound, an isocyanate-based curing agent, and a solvent.

In one embodiment, the polyol compound may include one or more of diol, triol and polymer polyol.

In one embodiment, the diol may include one or more of ethylene glycol, diethylene glycol, butanediol, and hexanediol.

In one embodiment, the triol may include one or more of glycerin, trimethylolpropane, and 1,2,3-hexanetriol.

In one embodiment, the polymer polyol may include one or more of polyolefin polyol, polyester polyol, polycaprolactone polyol, polyether polyol, and polycarbonate polyol.

The isocyanate-based curing agent may react with the polyol compound to form the first adhesive layer. In one embodiment, the isocyanate-based curing agent may include one or more of 4,4'-dicyclohexylmethane diisocyanate, 4,4-dimethylphenylmethane diisocyanate, bis-4-(isocyanate cyclohexyl)methane, hexamethylene diisocyanate, xylene diisocyanate, p-phenylene diisocyanate, tolidine diisocyanate, tetramethylene diisocyanate, dimethyl diisocyanate, trimethyl hexamethylene diisocyanate, phenylene diisocyanate, and dimethyl diphenyl diisocyanate.

In one embodiment, the solvent may include one or more of water, an alcohol having 1 to 10 carbon atoms, toluene, acetone, methyl ethyl ketone, dimethylformamide, and cyclohexane.

In one embodiment, the adhesive strength between a laminate of the skin layer and the fiber-based layer and the cushion layer may be 0.3 kgf/cm or more, as measured according to the ISO 813 standard. The adhesive strength may be a result obtained by measuring the adhesive strength between the skin layer/fiber-based layer laminate and the cushion layer according to Hyundai-Kia Motors MS Specification 256-29 (ISO 813 standard; 90° peeling method; peeling speed: 25 mm/min). If the adhesive strength is less than 0.3 kgf/cm, the adhesion between the laminate and the first adhesive layer (cushion layer) may be poor, and the tear shape of the airbag may be poor. For example, the adhesive strength may be 0.3 to 1.2 kgf/cm. For example, it may be 0.3, 0.4, 0.5, 0.6, 0.7, 0.8, 0.9, 1, 1.1 or 1.2 kgf/cm.

In one embodiment, the laminate of the skin layer and the fiber-based layer may have an adhesive strength of 0.3 kgf/cm or more to the first adhesive layer, as measured according to the ISO 813 standard. The adhesive strength may be a result obtained by measuring the adhesive strength between the skin layer/fiber-based layer laminate and the first adhesive layer according to Hyundai-Kia Motors MS Specification 256-29 (ISO 813 standard; 90° peeling method; peeling speed: 25 mm/min). If the adhesive strength is less than 0.3 kgf/cm, the adhesion between the laminate and the first adhesive layer (cushion layer) may be poor, and the tear shape of the airbag may be poor. For example, the adhesive strength may be 0.3 to 1.2 kgf/cm. For example, it may be 0.3, 0.4, 0.5, 0.6, 0.7, 0.8, 0.9, 1, 1.1 or 1.2 kgf/cm.

In one embodiment, the thickness of the first adhesive layer 50 may be 30 to 300 μm. Within this thickness range, the first adhesive layer may have excellent adhesion, and at the same time, the airbag can be easily deployed through the skin layer in the event of an external shock.

Cushion Layer

The cushion layer functions to secure the physical properties of the crash pad, such as heat resistance, impact resistance and light stability, and to impart tactile sensation such as cushion feeling to the driver and the passenger.

In one embodiment, the cushion layer includes slab foam. When the slab foam is included, the cushion layer may have excellent airbag deployment performance and cushion feeling compared to a conventional filament layer, and have excellent economic efficiency because of being cheaper than the conventional filament layer, and the airbag can be easily deployed in the event of an external shock while the airbag module is prevented from damage.

In one embodiment, the slab foam may be formed by foaming a first composition including a polyol compound, an isocyanate-based curing agent and a foaming agent.

In one embodiment, the polyol compound may include one or more of diol, triol, and polymer polyol.

In one embodiment, the diol may include one or more of ethylene glycol, diethylene glycol, butanediol, and hexanediol.

In one embodiment, the triol may include one or more of glycerin, trimethylolpropane, and 1,2,3-hexanetriol.

In one embodiment, the polymer polyol may include one or more of polyolefin polyol, polyester polyol, polycaprolactone polyol, polyether polyol, and polycarbonate polyol.

In one embodiment, the polyol compound may be included in an amount of 40 to 75 wt % based on the total weight of the first composition. When the polyol compound is included in an amount within the above range, the slab foam may have excellent mechanical strength. For example, the polyol compound may be included in an amount of 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 or 75 wt %, based on the total weight of the first composition.

The isocyanate-based curing agent may react with the polyol compound to form the slab foam. In one embodiment, the isocyanate-based curing agent may include one or more of 4,4'-dicyclohexylmethane diisocyanate, 4,4-dimethylphenylmethane diisocyanate, bis-4-(isocyanate cyclohexyl) methane, hexamethylene diisocyanate, xylene diisocyanate, p-phenylene diisocyanate, tolidine diisocyanate, tetramethylene diisocyanate, dimethyl diisocyanate, trimethyl hexamethylene diisocyanate, phenylene diisocyanate, and dimethyl diphenyl diisocyanate.

In one embodiment, the isocyanate-based curing agent may be included in an amount of 15 to 45 wt % based on the total weight of the first composition. When the isocyanate-based curing agent is included in an amount within this range, the slab foam may have excellent mechanical strength. For example, the isocyanate-based curing agent may be included in an amount of 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt %, based on the total weight of the first composition.

The foaming agent may include one or more of water, butane, n-pentane, c-pentane, hexane, heptane, chlorofluorocarbon (CFC 11), hydrogen chlorofluorocarbons (H-CFCs), hydrogen fluorocarbons (H-FCs), trichlorofluoromethane (Freon 11), chlorodifluoromethane (R-22), 1,1-dichloro-1-fluoroethane (HCFC-141b), and 1,1,1,3,3-pentafluoropropane (HFC-245fa).

In one embodiment, the foaming agent may be included in an amount of 1 to 15 wt % based on the total weight of the first composition. When the foaming agent is included in an amount within this range, the slab foam may have excellent mechanical strength. For example, the foaming agent may be included in an amount of 1, 2, 3, 4, 5, 6, 7, 8, 9, 10, 11, 12, 13, 14 or 15 wt %, based on the total weight of the first composition.

In one embodiment, the cushion layer may have a density of 0.05 to 5 g/cm3 and a porosity of 5 to 80%. Under these conditions, the crash pad may have excellent lightweight and mechanical strength properties.

In one embodiment, the cushion layer may have a tensile strength of 3 to 20 kgf/cm2, an elongation of 50 to 200% and a tearing strength of 0.2 to 1.5 kgf/cm, as measured according to Hyundai Motors Specification MS300-31. Under these tensile strength, elongation and tearing strength conditions, the cushion layer may have excellent physical properties, and at the same time, the air bag can be easily deployed through the cushion layer in the event of an external shock.

For example, the cushion layer may have a tensile strength of 3, 4, 5, 6, 7, 8, 9, 10, 11, 12, 13, 14, 15, 16, 17, 18, 19 or 20 kgf/cm2, as measured according to Hyundai Motors Specification MS300-31, an elongation of 50, 60, 70, 80, 90, 100, 110, 120, 130, 140, 150, 160, 170, 180, 190 or 200%, as measured according to Hyundai Motors Specification MS300-31, and a tearing strength of 0.2. 0.3, 0.4, 0.5, 0.6, 0.7, 0.8, 0.9, 1, 1.1, 1.2, 1.3, 1.4 or 1.5 kgf/cm, as measured according to Hyundai Motors Specification MS300-31.

For example, the cushion layer may have a thickness of 1 to 10 mm. When the cushion layer is formed to have this thickness, the cushion layer may have excellent physical properties, such as heat resistance, impact resistance and light stability, and the airbag deployment performance in the event of an external shock may be excellent. For another example, the cushion layer may have a thickness of 1 to 5 mm. For example, the cushion layer may have a thickness of 1, 2, 3, 4, 5, 6, 7, 8, 9 or 10 mm.

Second Adhesive Layer

FIG. 4 illustrates a crash pad according to another embodiment of the present disclosure. Referring to FIG. 4, a crash pad 300 may further include a second adhesive layer 52 formed between the cushion layer 20 and the core layer 10. When the second adhesive layer 52 is included, the adhesion between the cushion layer 20 and the core layer 10 may be improved.

The second adhesive layer 52 may include polyurethane. For example, the second adhesive layer 52 may include organic solvent-type polyurethane or water-dispersible polyurethane. In one embodiment, the second adhesive layer may be formed using a second adhesive composition. For example, the second adhesive composition may include a polyol compound, an isocyanate-based curing agent, and a solvent. The polyol compound, the isocyanate-based curing agent and the solvent may be the same as those of the first adhesive composition.

In one embodiment, the thickness of the second adhesive layer may be 30 to 300 Within this thickness range, the second adhesive layer may have excellent adhesion, and at the same time, the airbag can be easily deployed through the skin layer in the event of an external shock.

Core Layer

The core layer 10 forms the front of the driver's seat and the passenger's seat and functions to protect the driver and the passenger from an external shock when a crash or rollover accident occurs. In addition, the core layer 10 may have an insertion hole through which an airbag module is mounted, a mounting portion to which an air conditioner is mounted, etc.

In one embodiment, the core layer may include a matrix resin and an inorganic filler. For example, the matrix resin may include one or more of a polyolefin-based resin, a polycarbonate-based resin, and a styrene-based resin. The styrene-based resin may include an acrylonitrile-butadiene-styrene (ABS) resin. In one embodiment, the matrix resin may include one or more of a polypropylene resin and a PC/ABS resin.

In one embodiment, the inorganic filler may include one or more of talc, whisker, glass fiber, carbon fiber, basalt fiber, and polymer fiber.

In one embodiment, the thickness of the core layer may be 1 to 6 mm. When the core layer is formed to have this thickness, it may have excellent impact resistance, and the airbag deployment performance in the event of an external shock may be excellent. For example, the core layer may have a thickness of 3 to 4 mm. For example, the thickness of the core layer may be 1, 2, 3, 4, 5 or 6 mm.

In one embodiment, the core layer may include an airbag door portion through which the airbag is deployed. The airbag door portion may have a tear line for airbag deployment formed therein, and the tear line may have any one shape selected from among an "X" shape, a modified "X" shape, a "—" shape, an "H" shape, and a "U" shape. When the tear line is formed in this shape, the airbag can be easily deployed in the event of an external shock.

Primer Layer

In one embodiment, the crash pad may further include a primer layer (not shown) formed between the second adhesive layer and the core layer. When the primer layer is formed, the adhesion between the second adhesive layer and the core layer may be excellent.

In one embodiment, the thickness of the primer layer may be 5 to 500 μm. When the primer layer is formed to have this thickness, the adhesion between the second adhesive layer and the core layer may be excellent.

Method for Manufacturing Automotive Crash Pad

Another aspect of the present disclosure is directed to a method for manufacturing an automotive crash pad. FIG. 5 illustrates a method for manufacturing an automotive crash pad according to one embodiment of the present disclosure. Referring to FIG. 5, the method for manufacturing an automotive crash pad includes steps of: (S10) preparing an intermediate; and (S20) laminating the intermediate, a fiber-based layer and a skin layer together.

More specifically, the method for manufacturing an automotive crash pad includes steps of: (S10) preparing an intermediate by laminating a cushion layer and a core layer together; and (S20) laminating a fiber-based layer and a skin layer onto the intermediate, wherein a laminate of the skin layer and the fiber-based layer has a tensile strength in transverse direction (TD) of 5 to 50 kgf/3 cm and an elongation at break in transverse direction (TD) of 40 to 220%.

Hereinafter, each step of the method for manufacturing an automotive crash pad will be described in detail.

(S10) Step of Preparing Intermediate

This step is a step of preparing an intermediate by laminating a cushion layer and a core layer together. The cushion layer and the core layer that are used here may be the same as those described above.

In one embodiment, the cushion layer may have a thickness of 1 to 10 mm. When the cushion layer is formed to have this thickness, it may have excellent physical properties such as heat resistance, impact resistance and light stability, and the airbag deployment performance in the event of an external shock may be excellent. For another example, the thickness may be 1 to 5 mm.

The cushion layer includes slab foam. In one embodiment, the slab foam may be formed by foaming a first composition including a polyol, an isocyanate-based curing agent and a foaming agent.

In one embodiment, the core layer may have a thickness of 1 to 6 mm. When the core layer is formed to have this thickness, it may have excellent impact resistance, and at the same time, the airbag deployment performance in the event of an external shock may be excellent. For example, the thickness may be 3 to 4 mm.

In one embodiment, the cushion layer and the core layer may be laminated together by forming a second adhesive layer between the cushion layer and the core layer. For example, the cushion layer and the core layer may be laminated together by applying a second adhesive composition to one or more of the lower surface of the cushion layer and the upper surface of the core layer and curing the applied composition to form the second adhesive layer. The second adhesive composition that is used here may be the same as that described above.

In one embodiment, a primer layer (not shown) formed between the second adhesive layer and the core layer may be further included. When the primer layer is formed, the adhesion between the second adhesive layer and the core layer may be excellent.

In one embodiment, the cushion layer and the core layer may be laminated together by applying a primer to the surface of the core layer, drying the applied primer to form a primer layer, applying the second adhesive composition to each of the surface of the primer layer and the surface of the cushion layer to be laminated, and heating the applied composition. When the primer layer is formed, the adhesion between the second adhesive layer and the core layer may be excellent.

In one embodiment, the primer layer may have a thickness of 5 to 500 μm. When the primer layer is formed to have this thickness, the adhesion between the second adhesive layer and the core layer may be excellent.

(S20) Step of Laminating Intermediate, Fiber-Based Layer and Skin Layer Together This step is a step of laminating a fiber-based layer and a skin layer onto the intermediate. The fiber-based layer and the skin layer that are used here may be the same as those described above.

The skin layer may be formed using a skin layer composition including 65 to 75 wt % of a polyol compound, 15 to 25 wt % of an isocyanate-based curing agent, and 10 to 15 wt % of a chain extender.

In one embodiment, a laminate of the skin layer and the fiber-based layer have a tensile strength in transverse direction (TD) of 5 to 50 kgf/3 cm and an elongation at break in transverse direction (TD) of 40 to 220%. For example, a laminate of the skin layer having a thickness of 0.1 to 0.7 mm and the fiber-based layer having a thickness of 0.01 to 1 mm may have a tensile strength in transverse direction (TD) of 5 to 50 kgf/3 cm and an elongation at break in transverse direction (TD) of 40 to 220%, as measured at a test speed of 200 mm/min using an Instron UTM instrument according to Hyundai Motors Specification MS300-31.

If the laminate of the skin layer and the fiber-based layer has the tensile strength in transverse direction (TD) of less than 5 kgf/3 cm, the laminate may be easily damaged by an external shock because the strength thereof is excessively low, and if the laminate has a tensile strength in transverse direction (TD) of greater than 50 kgf/3 cm, the airbag cannot be deployed unless the skin layer is subjected to the skiving or scoring process.

If the laminate of the skin layer and the fiber-based layer has the elongation at break in transvers direction (TD) of less than 40%, the airbag may be difficult to quickly deploy through the skin layer in the event of an external shock, and if the laminate has the elongation at break in transverse direction (TD) of greater than 220%, the deployment shape of the airbag may be poor.

In one embodiment, the skin layer may have a thickness of 0.1 to 0.7 mm. Within this thickness range, the airbag can be easily deployed through the skin layer in the event of an external shock, even when the skin layer is not subjected to a skin layer-weakening process such as scoring or skiving, and the skin layer may have excellent mechanical properties.

In one embodiment, the skin layer may be formed by preparing two or more skin layer materials and then sewing the materials through single-needle stitching or double-needle stitching.

In one embodiment, the fiber-based layer may have a thickness of 0.3 to 0.7 mm. Within this thickness range, the crash pad may have excellent tactile sensation and cushion feeling, the airbag can be easily deployed through the skin layer in the event of an external shock, and the crash pad may have excellent physical properties.

In one embodiment, the fiber-based layer and the skin layer may be sequentially laminated onto one surface of the cushion layer of the intermediate.

In one embodiment, in the step of laminating the fiber-based layer and the skin layer onto the intermediate, the laminating may be achieved by forming a first adhesive layer between the fiber-based layer and the cushion layer. For example, the laminating may be achieved by applying a first adhesive composition to one or more of the lower surface of the fiber-based layer and the upper surface of the cushion layer and curing the applied composition to form the first adhesive layer. The first adhesive composition that is used here may be the same as that described above.

In one embodiment, the first adhesive layer may have a thickness of 30 to 300 μm. Within this thickness range, the first adhesive layer may have excellent adhesion, and at the same time, the airbag can be easily deployed through the skin layer in the event of an external shock.

In one embodiment, a surface treatment layer may be further formed on the upper surface of the skin layer. The surface treatment layer may include a polyurethane resin. For another example, the surface treatment layer may be formed by applying a water-dispersible polyurethane resin composition to the upper surface of the skin layer and curing the applied composition. The surface treatment layer that is used here may be the same as that described above.

In one embodiment, the surface treatment layer may have a thickness of 1 to 200 μm. Within this thickness range, the crash pad may have excellent appearance, light stability and antifouling properties.

(S30) Covering Step

In one embodiment, the method may further include a step of covering the fiber-based layer, the cushion layer and the core layer with the skin layer, after the step of laminating the fiber-based layer and the skin layer onto the intermediate.

In the present disclosure, the covering means a process of covering the fiber-based layer, the cushion layer and the core layer with the skin layer.

In one embodiment, after the intermediate, the fiber-based layer and the skin layer are laminated together and then the laminated intermediate, fiber-based layer and skin layer are pressed using a compression mold or the like, the fiber-based layer and the intermediate may be covered with the skin layer.

In one embodiment, the skin layer may not be subjected to a skiving or scoring process. The crash pad of the present disclosure allows the airbag to be easily deployed in the event of an external shock even when the skin layer-weakening process (skiving or scoring process) is not performed. Thus, under the above-described conditions, the skin layer-weakening process may be eliminated, and thus the number of processes can be reduced and excellent economic efficiency can be obtained.

In another embodiment of the present disclosure, the method for manufacturing a crash pad may include steps of: (S11) preparing a laminate; (S21) laminating the laminate and a core layer together; and (S31) covering.

(S11) Step of Preparing Laminate

This step is a step of preparing a laminate by laminating a skin layer, a fiber-based layer and a cushion layer together. The skin layer, fiber-based layer and cushion layer that are used here may be the same as those described above.

In one embodiment, the laminate may be prepared by sequentially laminating the fiber-based layer and the cushion layer on the lower surface of the skin layer. In one embodiment, in the step of preparing the laminate, the laminating may be achieved by forming a first adhesive layer between the fiber-based layer and the cushion layer. For example, the laminating may be achieved by applying a first adhesive composition to one or more of the lower surface of the fiber-based layer and the upper surface of the cushion layer and curing the applied composition to form the first adhesive layer. The first adhesive composition that is used here may be the same as that described above.

In one embodiment, the first adhesive layer may have a thickness of 30 to 300 µm. Within this thickness range, the first adhesive layer may have excellent adhesion, and at the same time, the airbag can be easily deployed through the skin layer in the event of an external shock.

In one embodiment, a surface treatment layer may be further formed on the upper surface of the skin layer. The surface treatment layer may include a polyurethane resin. For another example, the surface treatment layer may be formed by applying a water-dispersible polyurethane resin composition to the upper surface of the skin layer and curing the applied composition. The surface treatment layer that is used here may be the same as that described above.

In one embodiment, the surface treatment layer may have a thickness of 1 to 200 Within this thickness range, the crash pad may have excellent appearance, light stability and antifouling properties.

(S21) Step of Laminating Laminate and Core Layer Together

This step is a step of laminating the laminate and a core layer together. The core layer that is used here may be the same as that described above.

In one embodiment, the thickness of the core layer may be 1 to 6 mm. When the core layer is formed to have this thickness, it may have excellent impact resistance, and at the same time, the airbag deployment performance in the event of an external shock may be excellent. For example, the thickness thereof may be 3 to 4 mm.

In one embodiment, in the step of laminating the laminate and the core layer together, the laminating may be achieved by forming a second adhesive layer between the cushion layer of the stack and the core layer. For example, the laminating may be achieved by applying a second adhesive composition to one or more of the lower surface of the cushion layer of the laminate and the upper surface of the core layer and curing the applied composition to form the second adhesive layer. The second adhesive composition that is used here may be the same as that described above.

In one embodiment, the thickness of the second adhesive layer may be 30 to 300 Within this thickness range, the second adhesive layer may have excellent adhesion, and at the same time, the airbag can be easily deployed through the skin layer in the event of an external shock.

In one embodiment, the laminate and the core layer may be laminated together by applying a primer to the surface of the core layer, drying the applied primer to form a primer layer, applying the second adhesive composition to each of the surface of the primer layer and the surface of the cushion layer to be laminated, and heating the applied composition. When the primer layer is formed, the adhesion between the core layer and the second adhesive layer may be excellent.

In one embodiment, the primer layer may have a thickness of 5 to 500 µm. When the primer layer is formed to have this thickness, the adhesion between the second adhesive layer and the core layer may be excellent.

(S31) Covering Step

In one embodiment, the method may further include a step of covering the fiber-based layer, the cushion layer and the core layer with the skin layer, after the step of laminating the laminate and the core layer together.

In the present disclosure, the covering means a process of bringing the lower surface of the cushion layer of the laminate into contact with the upper surface of the core layer, and then covering the cushion layer and the core layer with the skin layer of the laminate.

In one embodiment, after the laminate and the core layer are laminated together and the laminated laminate and core layer are pressed using a compression mold or the like, the fiber-based layer, the cushion layer and the core layer may be covered with the skin layer.

In one embodiment, the skin layer may not be subjected to a skiving or scoring process. The crash pad of the present disclosure allows the airbag to be easily deployed even when the skin layer-weakening process (skiving or scoring process) is not performed. Thus, under the above-described conditions, the skin layer-weakening process may be eliminated, and thus the number of processes can be reduced and excellent economic efficiency can be obtained.

Hereinafter, the configuration and effects of the present disclosure will be described in more detail with reference to preferred examples. However, these examples are presented as preferred examples of the present disclosure and may not be construed as limiting the scope of the present disclosure in any sense. The contents that are not described herein can be sufficiently and technically envisioned by those skilled in the art, and thus the description thereof will be omitted herein.

Examples and Comparative Examples

Example 1

(1) Preparation of intermediate: A 1 to 6-mm-thick core layer including polypropylene was prepared. In addition, a cushion layer including slab foam was prepared, which was formed by foaming a first composition including 40 to 75 wt % of a polyol compound, 15 to 45 wt % of an isocyanate-based curing agent and 1 to 15 wt % of a foaming agent.

A primer was applied to the upper surface of the core layer and dried to form a primer layer (thickness: 5 to 10 µm).

A second adhesive composition including polyurethane was applied to each of the lower surface of the cushion layer and the upper surface of the primer layer to form a second adhesive layer (thickness: 1 to 15 µm) including water-dispersible polyurethane, and then the lower surface of the cushion layer and the upper surface of the primer layer were heat-cured and laminated together, thereby preparing an intermediate.

(2) Lamination of fiber-based layer and skin layer onto intermediate: A skin layer material was formed according to a conventional method using a skin layer composition including 65 to 75 wt % of a polyol compound, 15 to 25 wt % of an isocyanate-based curing agent and 10 to 15 wt % of a chain extender. Thereafter, a skin layer having the thickness shown in Table 1 below was formed by sewing the skin layer material through single-needle stitching or double-needle stitching. At this time, the skin layer was not subjected to a skiving or scoring process. On the lower surface of the skin layer, a fiber-based layer (density: 0.22 to 0.27 g/cm3, and thickness: 0.3–0.7 mm) in the form of a knitted fabric was formed, including polyethylene terephthalate (PET) fiber.

Thereafter, a first adhesive composition was applied to the lower surface of the fiber-based layer to form a first adhesive layer (thickness: 30 to 300 µm) including water-dispersible polyurethane, and then the lower surface of the first adhesive layer and the upper layer of the cushion layer of the intermediate were laminated together and heat-dried.

Figure 6:
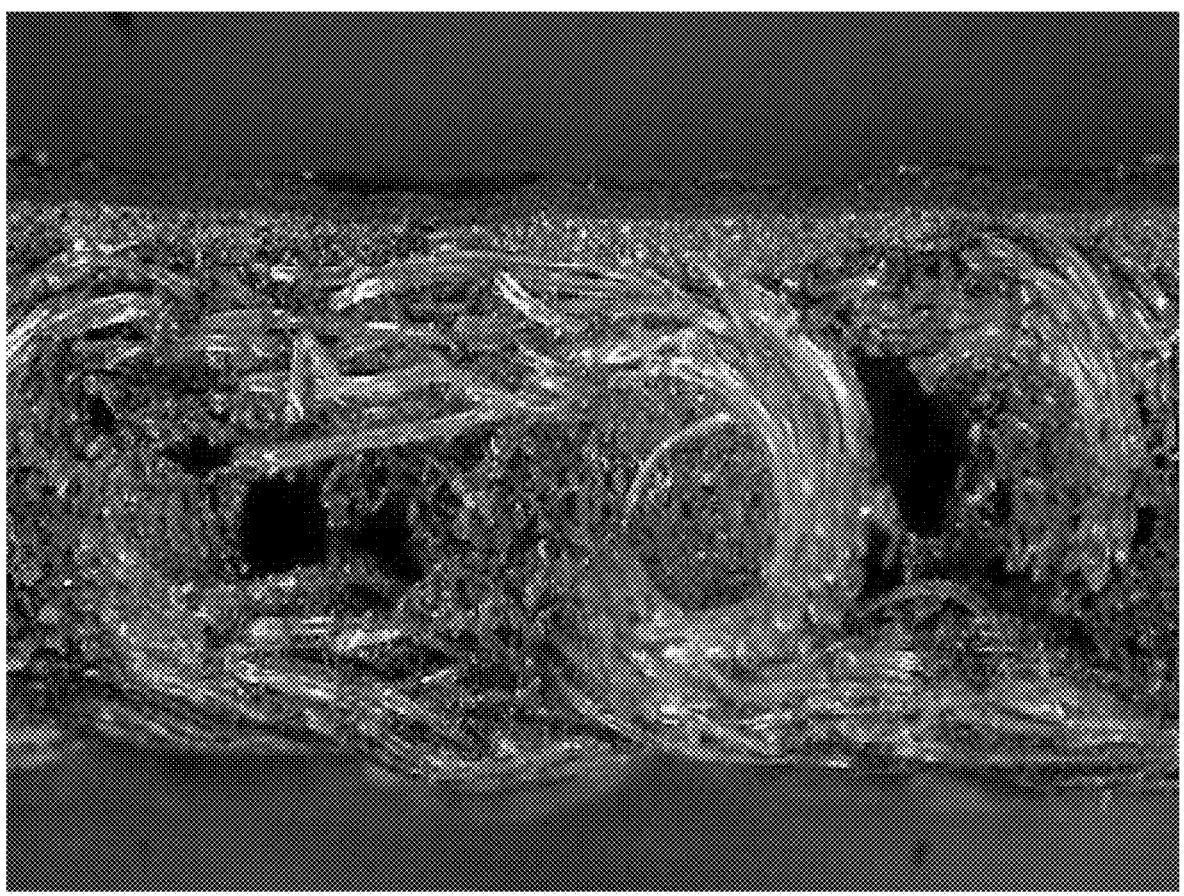
FIG. 6 shows the cross-section of a crash pad of Example 1.

(3) Covering with skin layer: The fiber-based layer, the cushion layer and the core layer were covered with the skin layer, thereby manufacturing a crash pad shown in FIG. 6.

Examples 2 to 4

Crash pads were manufactured in the same manner as in Example 1, except that skin layers having the thicknesses and physical properties shown in Table 1 below were applied.

Comparative Example 1

A crash pad was manufactured in the same manner as in Example 1, except that a filament cloth having a thickness of 4 mm was used instead of the slab foam as the cushion layer.

Comparative Examples 2 to 5

Crash pads were manufactured in the same manner as in Example 1, except that skin layers having the thicknesses and physical properties shown in Table 1 below were applied.

Test Example (A) Evaluation 1 of Physical Properties (1) Tensile Strength, Elongation and Tearing Strength of Laminate of Skin Layer and Fiber-Based Layer For a laminate of the skin layer and fiber-based layer of the crash pad manufactured in each of the Examples and the Comparative Examples, the tensile strength (kgf/cm2), elongation at break (%) and tearing strength (kgf/cm) in the transverse direction (TD) were measured at a test speed of 200 mm/min using an Instron UTM instrument according to Hyundai Motors Specification MS300-31.

(2) Adhesive Strength

For the skin layer/fiber-based layer laminate and first adhesive layer of the crash pad manufactured in each of the Examples and the Comparative Examples, the adhesive strength (kgf/cm) was measured according to Hyundai-Kia Motors MS Specification 256-29 (ISO 813 standard; 90° peeling method; peeling speed: 25 mm/min), and the results of the measurement are shown in Table 1 below.

(3) Tensile Strength, Elongation and Tearing Strength of Cushion Layer

For the cushion layer of the crash pad manufactured in each of the Examples and the Comparative Examples, the tensile strength (kgf/cm2), elongation at break (%) and tearing strength (kgf/cm) were measured according to the JIS K6301 standard, and the results of the measurement are shown in Table 1 below.

(4) Test for Evaluation of Airbag Deployment Performance

In accordance with Hyundai Motor ES84500-13 (passenger airbag invisible door performance specification), a passenger airbag (PAB) module was mounted in the crash pad manufactured in each of the Examples and the Comparative Examples. Then, the passenger airbag module was allowed to explode by applying an electrical signal to an inflator detonator at room temperature (21° C.), low temperature (−35° C.) and high temperature (85° C.). Thereafter, it is was checked whether the airbag moves toward the seam line groove intentionally formed on the crash pad of each of the Examples and Comparative Examples and is deployed through the seam line to the outside, and it was checked whether crash pad pieces scatter during airbag deployment. The results of the checking were recorded as "pass (P)" and "fail (F)" and shown in Table 3 below.

(5) Evaluation of Heat Resistance

According to Hyundai Motors MS specification 256-29, the crash pad of each of the Examples and the Comparative Examples was left to stand at 110° C. for 300 hours, and then the appearance defects of the cushion layer, such as lifting and peeling, were visually evaluated according to the following criteria: pass (P): there are no defects; and fail (F): defects such as lifting or peeling occurred. The results of the evaluation are shown in Table 1 below.

TABLE 1

| | | Example | | | | Comparative Example | | | | |
|---|---|---|---|---|---|---|---|---|---|---|
| | | 1 | 2 | 3 | 4 | 1 | 2 | 3 | 4 | 5 |
| Skin layer and fiber-based layer | Laminate thickness (mm) | 0.6 | 0.5 | 0.7 | 0.65 | 0.6 | 0.6 | 0.6 | 0.6 | 0.6 |
| | Tensile strength (kgf/3 cm) | 25 | 20 | 30 | 20 | 25 | 55 | 70 | 30 | 5 |
| | Elongation at break (%) | 150 | 180 | 200 | 100 | 150 | 200 | 100 | 300 | 50 |

TABLE 1-continued

|  |  | Example |  |  |  | Comparative Example |  |  |  |  |
|---|---|---|---|---|---|---|---|---|---|---|
|  |  | 1 | 2 | 3 | 4 | 1 | 2 | 3 | 4 | 5 |
|  | Tearing strength (kgf/cm) | 4 | 5 | 3 | 5 | 4 | 4 | 4 | 3.5 | 2.5 |
| Adhesive strength (kgf/cm) |  | 0.8 | 0.8 | 1.1 | 0.9 | 1.2 | 0.8 | 0.8 | 0.8 | 0.8 |
| Cushion layer | Cushion layer thickness (mm) | 4 | 4 | 4 | 4 | 4 | 4 | 4 | 4 | 4 |
|  | Tensile strength (kgf/cm$^2$) | 5.18 | 6.5 | 5.5 | 5.25 | 20 | 5.18 | 5.18 | 5.18 | 5.18 |
|  | Elongation at breakage (%) | 100.5 | 120 | 104 | 112 | 50 | 100.5 | 100.5 | 100.5 | 100.5 |
|  | Tearing strength (kgf/cm) | 0.44 | 0.52 | 0.48 | 0.51 | 5 | 0.44 | 0.44 | 0.44 | 0.44 |
| Airbag deployment performance: room temperature (21° C.) |  | P | P | P | P | P | F | P | F | F |
| Airbag deployment performance: low temperature (−35° C.) |  | P | P | P | P | P | F | F | F | F |
| Airbag deployment performance: high temperature (85° C.) |  | P | P | P | P | P | F | F | F | F |
| Heat resistance |  | P | P | P | P | P | P | P | P | P |

Referring to the results shown in Table 1 above, it could be seen that the crash pads of Examples 1 to 4 according to the present disclosure had excellent mechanical properties and interlayer adhesion, rapid airbag deployment was possible even when a skin layer-weakening process such as skiving or scoring was not applied thereto, and the shape of the door portion of the crash pad after airbag deployment was good. However, it could be seen that, in the case of Comparative Example 1 to which the cushion layer different from that of the present disclosure was applied, and in the case of Comparative Examples 2 to 5 which did deviate from the physical property conditions of the skin layer of the present disclosure, the airbag was not deployed rapidly or the airbag deployment shape was poor, and the airbag deployment performance deteriorated.

(B) Evaluation 2 of Physical Properties—Evaluation of Reliability:

For Example 1 representative of the Examples and the Comparative Example 1, the reliability of the following items was measured and the results of the evaluation are shown in Table 2 below.

(1) Heat Aging Resistance

For Example 1, a heat aging resistance test was performed according to Hyundai Motors specification MS257-06. Specifically, the heat aging resistance of a specimen of Example 1 was evaluated by heating the specimen, allowing the specimen to stand at 110° C. for 500 hours, and then measuring the tensile strength and elongation at break of the specimen.

(2) Moisture Aging Resistance

For Example 1, a moisture aging resistance test was performed according to Hyundai Motors specification MS257-06. Specifically, the moisture aging resistance of a specimen of Example 1 was evaluated by heating the specimen, allowing the specimen to stand at 50° C. and a relative humidity of 98RH % for 168 hours, and then measuring the tensile strength and elongation at break of the specimen.

(3) Hydrolysis Resistance (1)

For Example 1, a hydrolysis resistance test was performed according to Hyundai Motors specification MS257-06. Specifically, a specimen of Example 1 was heated and immersed in distilled water at 85° C. for 96 hours, and then the tensile strength and elongation at break of the specimen were measured.

(4) Hydrolysis Resistance (2)

For Example 1, a hydrolysis resistance test was performed according to Hyundai Motors specification MS257-10. Specifically, a specimen of Example 1 was heated and kept in a heat-resistant oven at 120° C. for 48 hours, and then the tensile strength and elongation at break of the specimen were measured.

TABLE 2

| Example 1 (cushion layer) | | | |
|---|---|---|---|
| Heat aging resistance | Tensile strength (kgf/cm$^2$) | 3.00 | Change rate: −42% |
|  | Elongation at break (%) | 92.2 | Change rate: −8.2% |
| Moisture aging resistance | Tensile strength (kgf/cm$^2$) | 4.82 | Change rate: −6.9% |
|  | Elongation at break (%) | 103.8 | Change rate: 3.3% |
| Hydrolysis resistance (1) | Tensile strength (kgf/cm$^2$) | 4.04 | Change rate: −21.9% |
|  | Elongation at break (%) | 98.7 | Change rate: −1.8% |
| Hydrolysis resistance (2) | Tensile strength (kgf/cm$^2$) | 5.16 | Change rate: −0.3% |
|  | Elongation at break (%) | 98.0 | Change rate: −2.5% |

Referring to the results shown in Table 2 above, it could be seen that Example 1 of the present disclosure had excellent reliability such as heat aging resistance, moisture aging resistance and hydrolysis resistance.

The present disclosure has been described with reference to the disclosed embodiments. Those skilled in the art will appreciate that the present disclosure can be implemented in modified forms without departing from the essential features of the present disclosure. Therefore, the disclosed embodiments should be considered in descriptive sense only, not for purposes of limitation. Therefore, the scope of the present disclosure is defined not by the detailed description of the present disclosure but by the appended claims, and all modifications within a range equivalent to the scope of the appended claims should be construed as being included in the present disclosure.

What is claimed is:

1. A method for manufacturing an automotive crash pad, the automotive crash pad including a skin layer forming an outer surface of the crash pad including an airbag module, a fiber-based layer formed on a lower surface of the skin layer, a cushion layer formed on a lower surface of the fiber-based layer and including slab foam, and a core layer formed on a lower surface of the cushion layer, wherein the automotive crash pad further comprises a first adhesive layer formed between the fiber-based layer and the cushion layer, and a second adhesive layer formed between the cushion layer and the core layer, the method comprising:
  preparing an intermediate by laminating the cushion layer and the core layer together; and
  laminating the fiber-based layer and the skin layer onto the intermediate,
  wherein the laminating of the fiber-based layer and the skin layer onto the intermediate includes forming a first adhesive layer between the fiber-based layer and the cushion layer,
  wherein the preparing of the intermediate includes forming a second adhesive layer between the cushion layer and the core layer,
  wherein the laminate of the skin layer and the fiber-based layer have an adhesive strength of 0.3 to 1.2 kgf/cm to the first adhesive layer,
  wherein a laminate of the skin layer and the fiber-based layer has a tensile strength in a transverse direction (TD) of 5 to 50 kgf/3 cm and an elongation at break in the transverse direction (TD) of 40 to 220%,
  wherein the fiber-based layer comprises knitted fabric having a weight of 150 to 200 g/m2 and a density of 0.22 to 0.27 g/cm3, and
  wherein the skin layer has a thickness of 0.1 to 0.4 mm and a tearing strength of 2 to 8 kgf/cm.

2. The method of claim 1, further comprising, after the laminating of the fiber-based layer and the skin layer onto the intermediate covering the fiber-based layer, the cushion layer, and the core layer with the skin layer.

3. The method of claim 1, wherein the slab foam is formed by foaming a first composition comprising a polyol compound, an isocyanate-based curing agent, and a foaming agent.

4. The method of claim 1, wherein the skin layer is not subjected to a skiving or scoring process.

* * * * *